Aug. 17, 1943.   F. D. POST   2,327,288
AUXILIARY SEAT FOR AUTOMOBILES
Filed Oct. 2, 1941   2 Sheets-Sheet 1
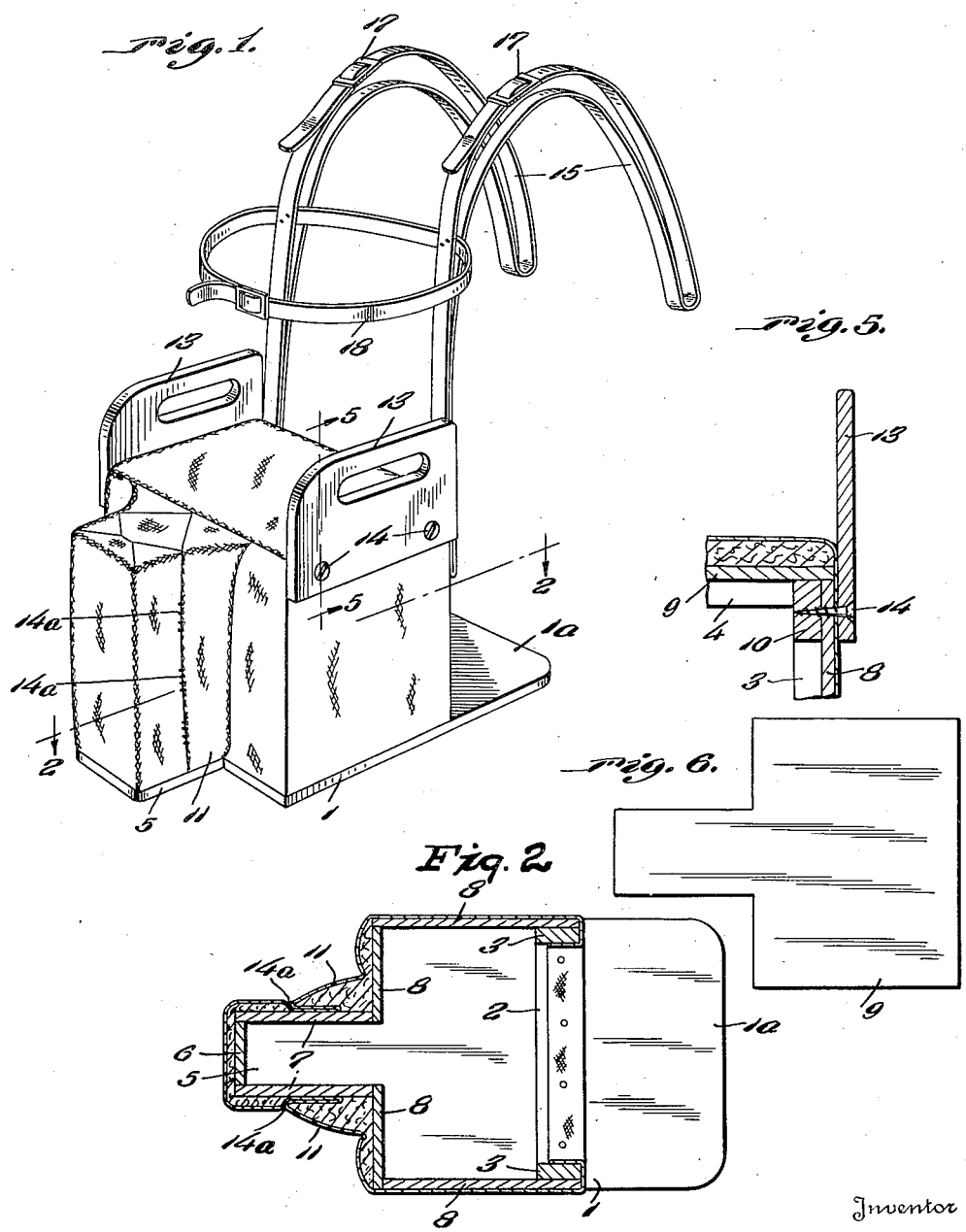
Inventor
Florence Dean Post
By Spear Donaldson & Hull
Attorney Aug. 17, 1943.  F. D. POST  2,327,288
AUXILIARY SEAT FOR AUTOMOBILES
Filed Oct. 2, 1941  2 Sheets-Sheet 2
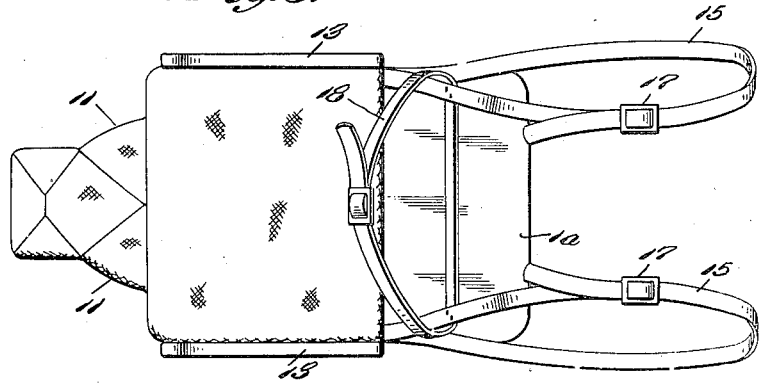
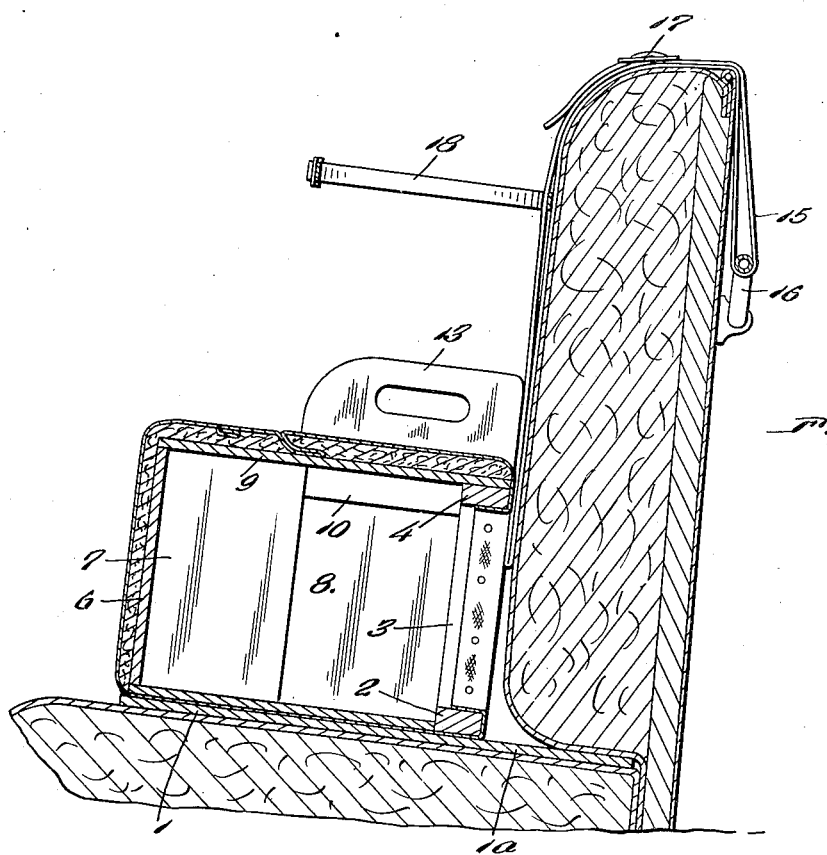
Inventor
Florence Dean Post
By Spear, Donaldson & Hall
Attorney Patented Aug. 17, 1943

2,327,288

UNITED STATES PATENT OFFICE 2,327,288

AUXILIARY SEAT FOR AUTOMOBILES

Florence Dean Post, St. Petersburg, Fla.

Application October 2, 1941, Serial No. 413,349

11 Claims. (Cl. 155—11)

The invention relates to an auxiliary seat for automobiles to accommodate young children.

In carrying out the invention, the auxiliary seat is associated with one of the main seats of the car, and is adapted to rest on said main seat, the construction of the auxiliary seat being such that the risk of damaging the main seat is reduced to a minimum.

The invention consists in the features and combination and arrangement of parts hereinafter described and pointed out in the claims.

In the accompanying drawings

Figure 1 is a perspective view of the auxiliary seat.

Fig. 2 is a plan view of a horizontal section on the line 2—2 of Figure 1.

Fig. 3 is a plan view of the seat.

Fig. 4 is a central vertical sectional view from front to rear showing flexible connections between the auxiliary seat and a portion of one of the main seats of the car.

Fig. 5 is a section on the line 5—5 of Fig. 1.

Fig. 6 is a plan view of the seat board.

In these drawings, 1 indicates a baseboard or runner, preferably of plywood, upon which is mounted a frame comprising a wooden strip or bar 2 which is secured to the said baseboard by nails or screws and extends across the upper face of said baseboard or runner at a point well forward of the rear edge of said baseboard, leaving an ample portion 1ª of said baseboard projecting at the rear to be inserted beneath the back of the main seat while resting on said main seat.

At the ends of the cross bar 2 are wooden standards 3 which extend vertically from the baseboard and serve as posts to support an upper cross bar or wooden strip 4 which connects with the upper ends of the posts or standards 3.

Sides made of plywood are secured to the upright posts or standards 3 and to the base or runner board. These parts may be attached to each other by nails, or otherwise.

The front end of the baseboard or runner has a centrally disposed projection of considerably reduced width as compared with the wide main part and rear portion of the runner board, and upon this reduced end marked 5 is built a column made up of plywood. This column comprises a front wall 6 of plywood and side walls 7 extending rearwardly from each edge of the front wall. From the rear edges of the said side walls 7 of the said column, other wall pieces 8 of plywood extend laterally along the edges of the baseboard or runner.

These various pieces of plywood may be secured in place by nails, which may be supplemented by other fastening means, if desired, as by the use of glue.

The seat proper comprises a plywood member 9 which may rest upon and be secured to the upper wooden crosspiece or bar 4. This seat board may be secured also to the upper ends of the standards or posts 3, and to the edges of the plywood walls forming the front hollow column. This seat board may be of substantially the same shape as the runner board, excepting that it does not have the rear extension 1ª like the said runner board.

Reinforcing bars of wood may be employed at 10 along the upper inner margins of the side boards, and to these reinforcing bars any parts of the adjoining members of the structure may be attached.

On the seat board 9, any suitable upholstery may be secured for the comfort of the child, and the hollow column at the front may be covered with any material which will provide a cushioning effect and a protection to the legs of the child. This material may be in the form of a wrapping of soft cotton sheeting. Cushions of suitable material may be placed in the recesses at the sides of the hollow front column where the sides of said column connect with the front wall of the main body of the seat structure. These cushions are shown at 11.

The top of the front central column being, as it is, a reduced extension of the upper seat board, will not interfere at all in placing the child in, or removing the child from, the seat proper, because the front column is only as high as the seat board of which it forms a part. The outer sides of the plywood sides and the front sides of the box-like body are covered with the cloth material.

The cushions or so-called upholstery are removable and replaceable.

Handles 13 are secured to the sides of the box-like structure. These handles may be replaced by others of greater height according to the size of the child. The means for removably securing the handle may vary, but as representative of suitable means for this purpose, I have shown screws 14.

It will be understood that the child occupying the seat will be sustained against lateral stresses as, for instance, when turning corners, or under other conditions, by these handle members reaching up along the sides of the child. The legs of the child will extend down along the sides of the padded column and lie in the right angular recesses formed by the sides of the hollow column and the adjoining front wall portions of the body of the appliance lying substantially at right angles to each other.

The material which provides the padding or cushioning is applied without the use of exposed nails, tacks, or other fastening devices, in respect, at least, to all those portions with which the child is apt to contact. Some portion of the padding material in sheet form is wrapped into place and is thereby held without any sort of fastening. This folded or wrapped material is indicated in connection with the front column of the appliance. Parts of the cushioning material may be secured together, and I have indicated stitches at 14a as an instance of the use of non-metallic fastening means for the cushioning material.

In automobiles as constructed today, the front seat has its upper surface inclining backwardly and downwardly, and the back member for this seat inclines backwardly and upwardly from the point where it contacts the rear edge of the front seat. In placing the child's auxiliary seat in position, the rearwardly projecting end of the baseboard or runner is thrust into the crevice between the lower edge of the main seat back and the upper surface of the rear portion of the front seat. This projection in practice may be substantially about 5 inches long, and, say, as an example, about 9 inches wide. When this extension of the baseboard of the auxiliary seat is thrust into place between the main seat and its back member, it will be in position with the box-like body portion of said auxiliary seat contacting the main seat back. The baseboard will incline upwardly and forwardly because of the inclined surface of the main seat. This will cause the surface of the auxiliary seat to assume a position inclining upwardly and forwardly, and to such a degree as will allow or induce the child to assume a slightly reclining position, which will contribute to safety and comfort. The front column which lies between the legs of the child will be elevated slightly to conform to the slope of the main seat, and may, in fact, be slightly above the surface of the forward portion of the main seat, though, of course, the exact relation of this inclined baseboard to the surface of the main seat will vary according to the weight of the child. The general position assumed by the child owing to the upward and forward inclination of the auxiliary seat will tend to throw the weight of the child in a slightly inclined rearward direction, resulting in stability of the auxiliary seat in respect to its proper postion relative to the main seat back against which the child is resting. This inclined position of the auxiliary seat will tend to prevent the said seat from creeping forwardly under the vibration of the car.

In order to provide means for attaching the auxiliary seat to the main seat back, straps 15 may be attached to the rear faces of the standards, and these straps may be carried over the top of the back of the main seat and connect in any suitable way to the rug rod or hand grip 16 attached to the rear side of the main seat back. Buckles 17 may be used to adjust these straps. There may also be a strap 18 to embrace the body of the child for additional safety in preventing the child from being unduly displaced in case of an accident, or sudden stoppage or arrest of the car's motion.

The space within the box-like body of the auxiliary seat organization may be used for storage purposes, and a suitable door may be employed to close in the space, if desired. The space is available for storage of the straps above mentioned when the auxiliary seat is not in use and is apart from the car.

The handles are attached to the body by readily removable fastening devices, so that the seat can be supplied with handle portions of different height to act as side guards for children of different sizes.

As before stated, the front columnar member terminates at its upper end at substantially the same level as the seating surface for the child, so that the child may readily be seated or be removed from the appliance. This column is rectangular in horizontal cross section, but being covered by the wrapping of sheet material and whatever thickness of padding may be used under the wrapping, there are no sharp corners which would hurt the occupant of this auxiliary seat.

The forward reduced extension of the baseboard upon which extension the front column is built up, is in one piece with the said baseboard and its rear extension. This forward extension normally may be more or less spaced above the surface of the main seat, but it will be free to come down more or less upon the upper surface of the main seat under conditions of shock or stress, and thus will help to keep the auxiliary seat from toppling over towards the front. This control will be aided by the rear extension of the baseboard engaging under the lower edge of the seat back.

As the super-structure or box-like member rests upon a baseboard substantially imperforate throughout rather than upon a frame of more or less open-work character, the seat of the car will not be damaged.

The baseboard or runner is in one plane throughout so that it may be readily thrust into position between the back and main seat members, or readily removed therefrom. This board does not grip positively any part of the seat, yet it will stay in working position under all usual conditions and extraordinary conditions will be taken care of by the fastening straps, and also by the position of the seat tending to throw the weight of the child rearwardly.

The box seat is high enough to permit the child to see the surroundings.

While plywood is desirably employed as the material of which my auxiliary seat is constructed, it will be understood that the invention is not limited thereto, and any other material suitable for the purpose may be used, such as plastic material, or aluminum, or other metal.

I claim:

1. An auxiliary seat for an automobile or the like comprising a baseboard, an overlying seat, means for supporting said seat from the baseboard, said board having an extension at its front end beyond the relative position of said overlying seat, and a column supported on said front extension of the baseboard and terminating at its upper end in the same plane in which the overlying seat lies, said column being positioned for receiving the legs of the child against its sides, substantially as described.

2. An auxiliary seat according to claim 1 in which the front extension of the baseboard is reduced in width relative to the seat and to the main part of the baseboard, said column being of substantially the same width as the said reduced extension, substantially as described.

3. An auxiliary seat organization comprising a seat member, a base board to rest on the main seat of the automobile, a support for the auxiliary seat of box-like form having an opening at the rear and adapted to bear on the back of the main seat, said box-like support resting on the base board substantially as described.

4. An auxiliary seat according to claim 1 in which the column at its rear edges adjoins front wall portions forming parts of the seat support.

5. An auxiliary seat according to claim 1 in which the column at its rear edges adjoins front wall portions forming parts of the seat support, said seat being provided with cushioning material and cushioning material covering the column and the front wall portions of the seat support.

6. An auxiliary seat for automobiles and the like comprising a runner board, a support extending up from said board, a seat on the support, said support having front wall portions, a column extending up from the runner board forward of and adjoining said wall portions and substantially at right angles thereto, said column terminating at its upper end in substantially the same plane in which the seat lies, cushioning material carried by the column which protects its upper end, its sides, corners and front, and cushioning material in the space defined by the front wall portions and the column, substantially as described.

7. An auxiliary seat for automobiles and the like according to claim 6 in which the cushioning material is wrapped about the said column, substantially as described.

8. In combination with a main seat and back of an automobile, an auxiliary seat organization comprising a runner board of a thinness to be slipped under the edge of the seat back, said runner board resting on the upwardly and forwardly inclined surface of the main seat and thereby assuming a position inclining downwardly and backwardly, a seat member connected with said runner board and supported thereby in an inclined position corresponding substantially to the inclination of said board, said board having a forward extension beyond the seat of reduced width and a column supported on said extension and reaching upwardly and backwardly between the child's legs, said column terminating at its upper end substantially in the plane in which the seat lies, substantially as described.

9. In an appliance according to claim 8, front boards extending from the runner board to the auxiliary seat and at right angles to the sides of the column for the child's leg to rest against.

10. An auxiliary seat for an automobile or the like comprising a baseboard having a forward extension of less width than the body of the board, a seat member supported by said baseboard and having a body portion and a forward extension of reduced width like that of the extension on the baseboard, and a column extending between and secured to said reduced forward extensions of the baseboard and seat member, said column being of a width substantially equal to the width of the reduced extension and adapted to lie between the legs of the child.

11. An auxiliary seat for an automobile comprising a seat member, a base board, means resting on the base board and supporting the said seat member, said base board having an extension at its front portion and having also an extension at its rear beyond the rear edge of the overlying seat member, the rear extension of the base board being of substantially the full width of the seat, but the front extension being of reduced width in respect to the full width of the seat member, and carrying a column to lie between the legs of the child occupying the auxiliary seat.

FLORENCE DEAN POST.